US009746242B2

United States Patent
Giebelhausen et al.

(10) Patent No.: US 9,746,242 B2
(45) Date of Patent: Aug. 29, 2017

(54) BURNER PIPE AND ROTARY KILN FOR PRODUCING ACTIVATED CARBON

(71) Applicant: Blucher GmbH, Erkrath (DE)

(72) Inventors: Jann-Michael Giebelhausen, Rathenow (DE); Sven Fitchner, Premnitz (DE); Christian Schrage, Dresden (DE)

(73) Assignee: Blücher GmbH, Erkrath (DE)

( * ) Notice: Subject to any disclaimer, the term of this patent is extended or adjusted under 35 U.S.C. 154(b) by 130 days.

(21) Appl. No.: 14/891,498

(22) PCT Filed: Apr. 8, 2014

(86) PCT No.: PCT/EP2014/057056
§ 371 (c)(1),
(2) Date: Nov. 16, 2015

(87) PCT Pub. No.: WO2014/183927
PCT Pub. Date: Nov. 20, 2014

(65) Prior Publication Data
US 2016/0084574 A1    Mar. 24, 2016

(30) Foreign Application Priority Data

May 17, 2013  (DE) .................. 10 2013 008 412
Jun. 14, 2013  (DE) .................. 10 2013 009 961

(51) Int. Cl.
| F27B 7/14 | (2006.01) |
| F27B 7/16 | (2006.01) |
| C01B 31/08 | (2006.01) |
| C01B 31/10 | (2006.01) |

(52) U.S. Cl.
CPC ............ *F27B 7/161* (2013.01); *C01B 31/088* (2013.01); *C01B 31/10* (2013.01); *F27B 7/16* (2013.01); *F27B 7/162* (2013.01)

(58) Field of Classification Search
CPC ........ F23G 2203/208; F27B 7/14; F27B 7/16; F27B 7/161; F27B 7/162; F27D 1/0006; F27D 1/003; C10B 47/30
USPC ................................. 432/118, 119
See application file for complete search history.

(56) References Cited

U.S. PATENT DOCUMENTS

| 2,939,693 | A | * | 6/1960 | Old .................. F27B 7/162 252/378 R |
| 9,181,488 | B2 | * | 11/2015 | Marszal .................. C10B 21/20 |
| 2006/0269887 | A1 | * | 11/2006 | Von Blucher ........... F27B 7/162 432/118 |
| 2007/0031772 | A1 | * | 2/2007 | Von Blucher ......... F27B 7/2206 432/118 |

(Continued)

FOREIGN PATENT DOCUMENTS

| DE | 10 2004 036109 | 2/2006 |
| WO | 03/027590 | 4/2003 |

OTHER PUBLICATIONS

International Preliminary Report on Patentability, English Translation, PCT/EP2014/057056, Nov. 11, 2015.

*Primary Examiner* — Gregory A Wilson
(74) *Attorney, Agent, or Firm* — Edward E. Sowers; Brannon Sowers & Cracraft PC

(57) ABSTRACT

The invention relates to a burner pipe for a rotary kiln for producing activated carbon and to a rotary kiln comprising said burner pipe. The invention further relates to the use of the burner pipe or rotary kiln for producing activated carbon.

18 Claims, 4 Drawing Sheets

(56) References Cited

U.S. PATENT DOCUMENTS

Figures 1, 2:
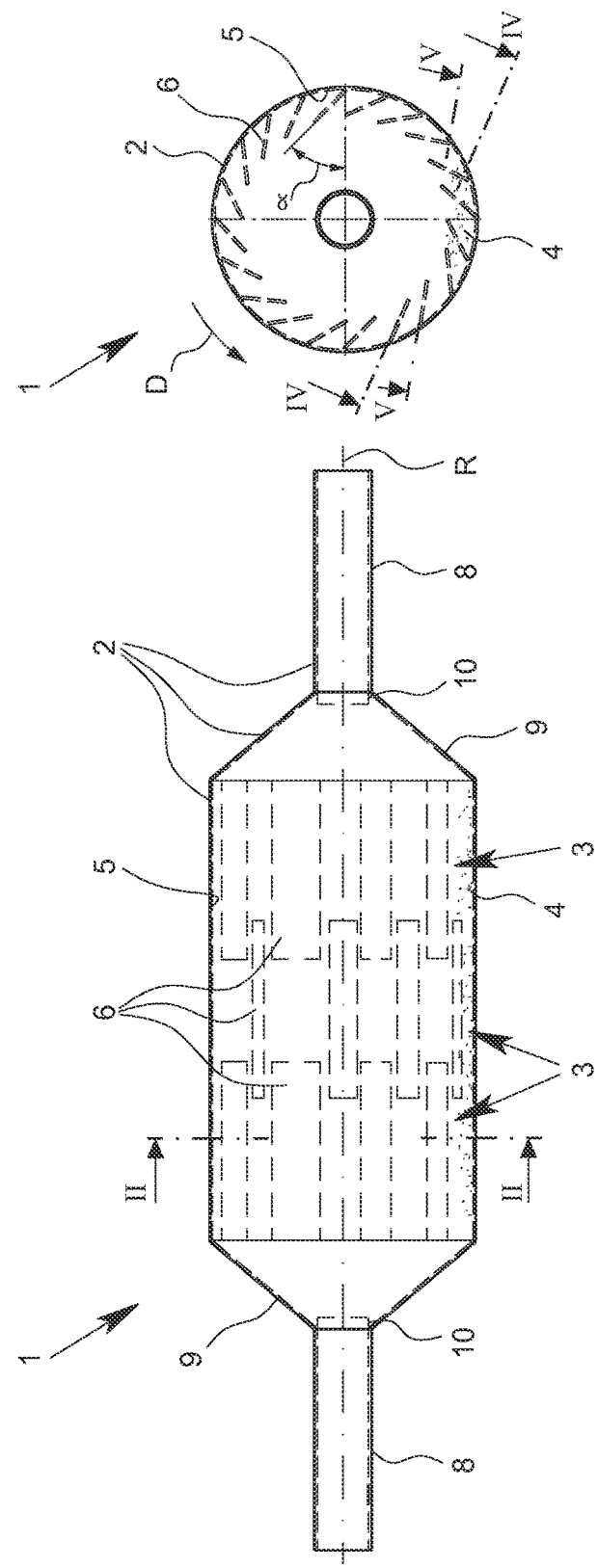

| | | | |
|---|---|---|---|
| 2007/0131150 A1* | 6/2007 | Yamazaki | C01B 31/081 110/229 |
| 2008/0070178 A1* | 3/2008 | Bohringer | C01B 31/088 432/118 |
| 2012/0308951 A1* | 12/2012 | Zhu | C10B 47/30 432/200 |
| 2016/0136597 A1* | 5/2016 | Taylor | B01F 9/08 366/224 |

* cited by examiner

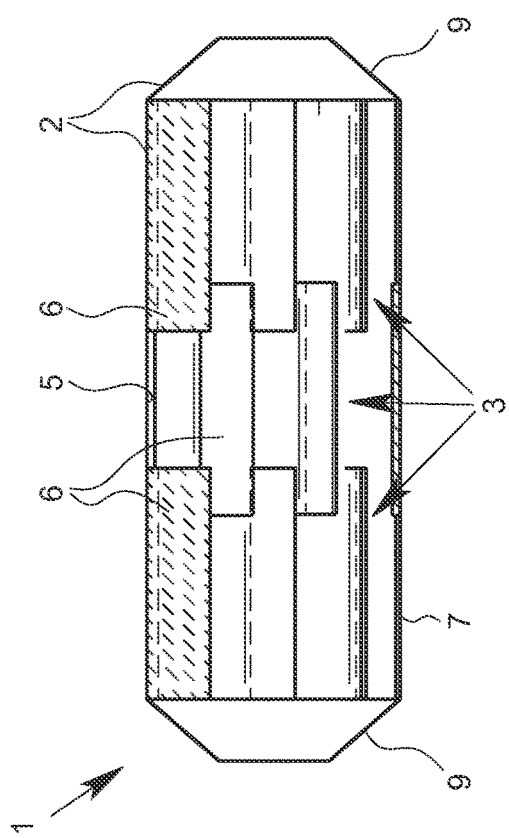
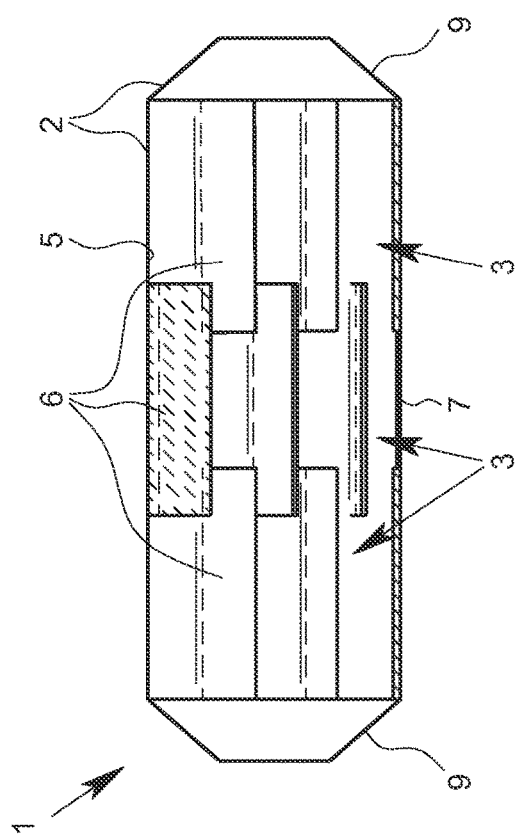

BURNER PIPE AND ROTARY KILN FOR PRODUCING ACTIVATED CARBON

CROSS-REFERENCES TO RELATED APPLICATIONS

This application is a National Stage filing of International Application PCT/EP 2014/057056, filed Apr. 8, 2014, claiming priority to German Applications No. DE 10 2013 008 412.1 filed May 17, 2013, and DE 10 2013 009 961.7 filed Jun. 14, 2013, entitled "Burner Pipe and Rotary Kiln for Producing Activated Carbon". The subject application claims priority to PCT/EP 2014/057056, and to German Applications No. DE 10 2013 008 412.1, and DE 10 2013 009 961.7 and incorporates all by reference herein, in their entirety.

BACKGROUND OF THE INVENTION

The present invention relates to a rotary tube for a rotary tube furnace as per the preamble of claim 1 and a rotary tube furnace having such a rotary tube. Furthermore, the present invention relates to the use of such a rotary tube or rotary tube furnace for producing activated carbon.

Activated carbon is the most widely used adsorbent because of its quite unspecific adsorptive properties. Legal requirements, but also increasing environmental consciousness, are leading to an increased demand for activated carbon.

Here, activated carbon is increasingly employed both in the civilian sector and in the military sector. In the civilian sector, activated carbon is employed, for example, for the purification of gases, filter units for air conditioning and automobile filters, while in the military sector activated carbon is used, for example, in protective materials of all types (e.g. breathing protection masks, protective coverings and pieces of protective clothing of all types, e.g. protective suits).

Activated carbon is generally obtained by sulfonation, carbonization (synonymously also referred to as low-temperature carbonization, pyrolysis or coking) and subsequent activation of suitable carbon-containing starting materials. Here, preference is given to starting materials which lead to economically feasible yields. This is because elimination of volatile constituents during carbonization and as a result of burning during activation lead to considerable weight losses. For further details on the production of activated carbon, reference may be made, for example, to the publication H. v. Kiente and E. Bäder "Aktivkohle and ihre industrielle Anwendung", Enke Verlag Stuttgart, 1980.

The nature of the activated carbon produced, fine- or coarse-pore, strong or brittle, etc., depends on the carbon-containing starting material. Customary starting materials are, for example, coconut shells, wood scrap, peat, hard coal, pitch, or else particular plastics such as polymers which play an important role in, inter alia, the production of activated carbon in the form of grains or spheres.

Activated carbon is used in a variety of forms: powdered carbon, crushed carbon, shaped carbon and since the end of the 1970s also granular and spherical activated carbon (known as "granulated carbon" or "spherical carbon"). Granular, in particular spherical, activated carbon has a series of advantages over other forms of activated carbon which make it valuable or even indispensable for particular applications: it is free-flowing, tremendously abrasion-resistant, dust-free and very hard. Granular carbon, in particular spherical carbon, is very sought-after for particular fields of use, e.g. sheet-like filter materials for protective suits to protect against chemical poisons or filters for low pollutant concentrations in large amounts of air, because of its specific shape but also because of its extremely high abrasion resistance.

In the production of activated carbon, in particular granular carbon and spherical carbon, suitable polymers are in most cases used as starting materials. Preference is given to using polymers, in particular divinylbenzene-crosslinked styrene polymers. For example, the precursors of ion-exchange resins (i.e. unsulfonated ion-exchange resins), which are usually divinylbenzene-crosslinked polystyrene resins, serve as suitable starting material. This starting material is then typically sulfonated in-situ in the presence of sulfuric acid or oleum.

However, it is also possible to use ion-exchange resins (e.g. cation-exchange resins or acidic ion-exchange resins, preferably having sulfonic acid groups, e.g. cation-exchange resins based on sulfonated styrene-divinylbenzene copolymers). No subsequent sulfonation is carried out in the case of this starting material.

Sulfonation is a reaction in which a sulfonic acid group or sulfo group is introduced into an organic compound. The reaction products are referred to as sulfonic acids. In the case of finished ion exchangers, the sulfonic acid groups are already present in the material, while in the case of the ion exchanger precursors they have to be introduced by sulfonation. The sulfonic acid groups perform a critical function since they play the role of a crosslinker by being eliminated during carbonization. However, the large amounts of sulfur dioxide liberated and the associated corrosion problems in the production apparatuses are disadvantageous and problematical.

The production of activated carbon is usually carried out in rotary tube furnaces. These have, for example, an inlet opening for charging with a feed material and for introducing gases and also an output opening for taking out the end product and for discharging gases. The production of activated carbon in rotary tube furnaces can be carried out in a continuous or batch process.

In the carbonization, which can be preceded by a precarbonization or low-temperature carbonization phase, the carbon-containing starting material is converted into carbon, i.e. in other words the starting material is carbonized. In the carbonization of the above-mentioned organic polymers based on styrene and divinylbenzene, the functional chemical groups, in particular sulfonic acid groups, are destroyed with elimination of volatile constituents, in particular $SO_2$, and free radicals, which have a strong crosslinking action, are formed without there being a pyrolysis residue (=carbon). The organic polymers contain crosslinking functional chemical groups (in particular sulfonic acid groups) which on thermal decomposition lead to free radicals and thus to crosslinks.

In general, the carbonization is carried out under an inert atmosphere (e.g. nitrogen) or at most a slightly oxidizing atmosphere. It can equally well be advantageous to add a small amount of oxygen, in particular in the form of air (e.g. from 1 to 5%), to the inert atmosphere during carbonization, in particular at relatively high temperatures (e.g. in the range from about 500° C. to 650° C.), in order to bring about oxidation of the carbonized polymer skeleton and in this way aid subsequent activation.

Owing to the acidic reaction products (e.g. $SO_2$) eliminated during carbonization, this stage of the production process for the activated carbon is extremely corrosive in respect of the material of the rotary tube or rotary tube furnace and places severe demands on the corrosion resistance of the material of the rotary tube or rotary tube furnace.

The carbonization is then followed by activation of the carbonized starting material. The basic principle of activation is to degrade, selectively and in a targeted manner, part of the carbon generated in the carbonization under suitable conditions. This forms additional pores, clefts and cracks and the surface area per unit mass of the activated carbon increases considerably. Thus, a targeted burning of the carbon is carried out during activation. Since carbon is reacted during activation, a sometimes considerable loss of material occurs during this operation, and this is, under optimal conditions, equivalent to an increase in the porosity and produces an increase in the internal surface area (pore volume) of the activated carbon. The activation is therefore carried out under selective or controlled oxidizing conditions.

Customary activating gases are, in general, oxygen, especially in the form of air, water vapor and/or carbon dioxide and also mixtures of these activating gases. Inert gases (e.g. nitrogen) can optionally be added to the activated gases. In order to achieve an industrially satisfactory high reaction rate, the activation is generally carried out at relatively high temperatures, in particular in the temperature range from 700° C. to 1200° C., preferably from 800° C. to 1100° C. This places great demands on the temperature resistance of the material of the rotary tube.

The various process steps, namely sulfonation, carbonization and activation, place different, severe demands on the material of the rotary tube. Particularly when all three process steps are to be carried out batchwise in a single rotary tube, the material of the rotary tube has to withstand
a) the highly corrosive conditions during sulfonation,
b) the very corrosive conditions during carbonization and
c) the high-temperature conditions during activation.

For this reason, only materials which combine good resistance to chemically aggressive materials, in particular a high resistance to acids, a good corrosion resistance and a good high-temperature stability in one material are used for producing the rotary tube.

A further requirement which the rotary tube has to meet results from the need for homogeneous contacting of the feed material, in particular the sulfonated, carbonized starting materials, with the activating gases. For this reason, means for intimate mixing of the feed material are provided. Without sufficient mixing of the feed material during rotation of the rotary tube, a significant part of the feed material rests against an interior of the rotary tube during rotation of the rotary tube or the individual particles of the feed material rest on one another and are rotated with the rotary tube until they finally drop downward. As a result, both the contact area and the contact time of the feed material with the activating gases are very low. This results in poorer quality activated carbon, namely an activated carbon having a low degree of activation, in particular having a less porous structure and a lower internal active surface area. Furthermore, unsatisfactory mixing of the feed material increases the time required for producing the activated carbon, in particular the activation time.

A rotary tube which satisfies the above-mentioned requirements is disclosed in DE 10 2004 036 109 A1, from which the present invention proceeds. The known rotary tube is provided for a rotary tube furnace and is configured for the production of activated carbon by means of sulfonation, carbonization and activation in a batch process. The rotary tube has a rotary tube body and at least one mixing section for mixing a feed material.

The mixing section of the known rotary tube has a plurality of mixing elements having fastening sections. The fastening sections of the mixing elements are pushed in through openings in the rotary tube body and welded on the outside of the rotary tube body. In the known rotary tube, it was recognized that mixing elements welded on the inside to an inside of the rotary tube are problematical since welding of the mixing elements can result in embrittlement of the material and since the welding seams in the interior of the rotary tube, which are subjected to severe stresses during activated carbon production, require continual maintenance and checking outside operation of the rotary tube.

Although the rotary tube body and the mixing elements of the known rotary tube consist of high-temperature-resistant and corrosion-resistant, high-alloy steel, abrasion of metals from the high-alloy steel can occur during rotation of the known steel rotary tube as a result of sliding of the feed material over the inside of the rotary tube body and over the mixing elements. This metal abrasion leads to contamination of the activated carbon. This shows up in, for example, an increased iron content in the activated carbon.

However, to meet high-purity requirements, for example in the pharmaceutical sector, it is necessary to have activated carbon which has no such impurities, in particular no iron-containing impurities or other traces of metal originating from the steel of the rotary tube.

BRIEF SUMMARY OF THE INVENTION

It is an object of the present invention to develop the known rotary tube or the known rotary tube furnace further in such a way that impurities, in particular traces of metal, in the activated carbon are avoided or minimized in the production of activated carbon and at the same time high throughputs and high degrees of activation of the activated carbon are achieved.

The objective indicated above is achieved by a rotary tube as described herein. Embodiments of these aspects of the invention are similarly described.

The present invention further provides for the use of the rotary tube or rotary tube furnace of the invention for producing activated carbon, in particular by means of sulfonation, carbonization and activation in a batch process. Further, advantageous embodiments of the use according to the invention are further described.

It goes without saying that embodiments, variants, advantages and the like which are, for the purpose of avoiding repetition, indicated below for one aspect of the invention apply analogously to the other aspects of the invention.

This having been said, the present invention is described in more detail below.

DETAILED DESCRIPTION OF THE INVENTION

In the rotary tube of the invention, the at least one mixing section has at least one mixing element which is fastened to an inside of the rotary tube body and is firmly joined to the inside. A mixing section extends over a region of the rotary tube and differs from other mixing sections in respect of its position in the rotary tube and/or its configuration, e.g. the arrangement in the rotary tube, the arrangement relative to one another, the shape and/or the size in each case of the mixing element or mixing elements of the mixing section. A plurality of mixing sections must not be separate but instead can also overlap.

The mixing element provided on the inside of the rotary tube body ensures very good mixing of the feed material, which is advantageous for the reactions in the production of activated carbon proceeding to completion, brings about more homogeneous process conditions for the individual particles of the feed material, i.e., for example, uptake of an at least essentially equal heat flow or an at least essentially equal quantity of heat, leads to higher-quality activated carbon, namely to an activated carbon having a highly porous structure, a large internal active surface area and thus a high degree of activation, reduces the time required for producing the activated carbon since, in particular, the activation phase is shortened and allows high throughputs per unit time.

Particularly when all three process steps (sulfonation, carbonization and activation) are to be carried out in a batch process in a single rotary tube, the material of the mixing element and of the rotary tube body has to withstand both the highly corrosive conditions during sulfonation, the very corrosive conditions during carbonization and also the high-temperature conditions during activation. According to the invention, the rotary tube body and the mixing element consist at least essentially of quartz glass.

Quartz glass (fused silica) is a material which ensures good resistance to chemically aggressive materials, in particular a high resistance to acids, good corrosion resistance, a high softening temperature and heat resistance and also low thermal expansion combined with a high temperature change resistance.

Quartz glass occurs in nature but can also be produced synthetically (e.g. by means of flame hydrolysis). Quartz glass is the purest form of silicon dioxide ($SiO_2$) and accordingly the most valuable and most highly developed variety of glass.

Among the most important properties of quartz glass, in particular synthetic quartz glass, is the high chemical purity. Foreign materials occur only as traces. Thus, for example, the iron content of synthetic quartz glass is typically less than 0.1 ppm.

The use of quartz glass instead of steel for the rotary tube body and the mixing element avoids or considerably reduces contamination of the activated carbon by traces of metal. This is due firstly to the high chemical purity of quartz glass. Secondly, abrasion of the traces of metal, which are in any case present in small amounts, from the quartz glass is made significantly more difficult and ultimately negligible because of the very smooth surface of the quartz glass.

At the same time, the use of quartz glass requires design and manufacture of the rotary tube to meet high standards. Owing to the very smooth surface of quartz glass, the feed material slides to an even greater extent over the inside of the rotary tube body than when steel is used. This in principle makes good mixing of the feed material more difficult and thus places high demands on the realization of the mixing section, in particular the mixing element or mixing elements.

Particularly when all three process steps (sulfonation, carbonization and activation) are to be carried out in a batch process in a single rotary tube, the use of a rotary tube having a rotary tube body made of quartz glass without at least one mixing section, in particular without a mixing element, is problematical since otherwise insufficient mixing per unit time is achieved and the throughput in the production of activated carbon and the degree of activation of the activated carbon would be too low.

It would in principle be possible to provide mixing sections in the rotary tube body by means of depressions or dents or concave regions projecting into the interior of the rotary tube body. Although such depressions to be introduced from the outside of the rotary tube body would improve mixing compared to a smooth interior surface, a satisfactory degree of mixing would still not be achieved.

It would theoretically also be possible to provide slits in the rotary tube body for accommodating mixing elements, as has been described in the prior art in the case of steel rotary tube bodies. However, fastening of a mixing element to the outside of the rotary tube body, as in the case of the known rotary tube, is not possible or not practicable when using quartz glass as material for the rotary tube body and the mixing element since this would very easily lead to damage, in particular cracks, in the quartz glass.

In the case of the rotary tube of the invention, a new route has in which, as a difference from the prior art, the at least one mixing element is fastened to the inside of the rotary tube body and is firmly joined to the inside has now been taken.

In the context of the invention, it has been found that the fastening or installation of the mixing element consisting of quartz glass on the inside of the rotary tube body which likewise consists of quartz glass represents a great challenge. It was initially believed that fastening of mixing elements composed of quartz glass on the inside of the rotary tube body composed of quartz glass was not possible or not practicable. Before the invention arose, the rotary tube according to the invention was considered to be impossible to implement industrially. The view was that mixing elements which are fastened to the inside of the rotary tube body and firmly joined to the inside lead to stresses and ultimately damage, in particular cracks, in the quartz glass surrounding the fastening positions in the rotary tube body. In experiments in which all mixing elements had been fastened to the inside of the rotary tube body and at the same time firmly joined to the inside, the abovementioned damage did actually occur.

However, it has surprisingly been found that the abovementioned problems do not occur when the mixing element or mixing elements is/are thermally fastened individually or in groups to the inside of the rotary tube body by means of a binder and firmly joined individually or in groups to the inside. The binder also serves to preposition the individual mixing elements on the inside of the rotary tube body. The mixing elements are joined to the inside of the rotary tube body with the aid of the binder by low-stress heat treatment, in particular fused on. The contact region between the respective mixing element and the inside of the rotary tube body is heat treated subsequently in such a way that any stresses present in the quartz glass are eliminated or reduced. The subsequent heat treatment can take up to one day per mixing element.

Although this method of production is very time-consuming and thus costly, it makes it possible for the first time to obtain a rotary tube having a rotary tube body and mixing elements composed of quartz glass, by means of which contamination of the activated carbon, in particular by traces of metal, are avoided or minimized, with very good mixing of the feed material, high throughputs and high degrees of activation of the activated carbon produced being achieved at the same time.

The rotary tube of the invention thus makes it possible to produce high-quality activated carbon which satisfies high-purity requirements, for example in the pharmaceutical sector.

At the same time, the rotary tube of the invention has a high heat resistance, which is particularly advantageous for activation. In addition, the rotary tube of the invention withstands very corrosive conditions of carbonization. The rotary tube of the invention also has a high resistance to a wide range of elements and compounds, in particular acids, especially sulfuric acid.

Thus, activated carbon can be produced in a single rotary tube according to the invention by means of sulfonation, carbonization and activation in a batch process. This avoids reloading of the feed material and the production and/or use of a plurality of rotary tubes.

In addition, the rotary tube of the invention reduces the required production time and thus also the production costs. The rotary tube of the invention also makes it possible to decrease reject material.

For the purposes of the present invention, the term "rotary tube" refers to an essentially horizontal, rotationally symmetric tube which is mounted so as to be rotatable. The internal cross section of the rotary tube has to be neither uniform nor circular in the axial direction, i.e. in the direction of the axis of rotation.

The term "feed material" refers, for the purposes of the invention, to the materials which are present in the rotary tube and are to be processed in the respective process step, in particular the polymeric starting material, sulfuric acid, sulfonated polymers, carbonized sulfonated polymers, activating gases and also the activated carbon which has been activated.

The above-mentioned aspects and features of the present invention and also the aspects and features of the invention which can be derived from the further description and the claims can be realized independently of one another but also in any combination.

Further advantages, features and aspects of the present invention can be derived from the claims and the following descriptions of preferred embodiments with the aid of the drawing.

In the figures, the same reference symbols are used for identical or similar parts, with corresponding properties and advantages being achieved even when a repeated description is omitted.

FIG. 1 schematically shows a plan view or front view of a first preferred embodiment of a rotary tube 1 according to the invention for a rotary tube furnace (not shown). This comprises essentially a heating device which at least partly surrounds the rotary tube or the reactor part thereof. In particular, the reactor part can be arranged in or over a shell-like heating device.

The rotary tube 1 is rotationally symmetric about an axis of rotation R, which here defines the axial direction.

The rotary tube 1 is configured for producing activated carbon in a three-stage process, namely, according to the first preferred embodiment, for sulfonation, carbonization and activation of polymeric starting materials in a batch process. As polymeric starting materials, use is made of precursors of ion-exchange resins (i.e. unsulfonated ion-exchange resins), in particular divinylbenzene-crosslinked polystyrene resins.

The rotary tube 1 essentially has a rotary tube body 2 and at least one mixing section 3 for mixing a feed material 4 and the mixing section 3 has at least one mixing element 6 which is fastened to an inside 5 of the rotary tube body 2 and is firmly joined to the inside 5.

The first preferred embodiment of the rotary tube 1 of the invention has three mixing sections 3 having a plurality of, preferably 30, mixing elements 6. In FIG. 1, the mixing elements 6 are depicted by means of broken lines.

According to the invention, the rotary tube body 2 and the mixing elements 6 consist at least essentially of quartz glass.

The rotary tube 1 allows the production of activated carbon with avoidance or minimization of contamination of the activated carbon, in particular by traces of metal, and at the same time very good mixing of the feed material 4, high throughputs, a low reject rate and a high degree of activation of the activated carbon are achieved. The rotary tube 1 thus makes it possible to produce high-quality activated carbon which satisfies high-purity requirements, for example in the pharmaceutical sector.

Furthermore, the rotary tube 1 has a high heat resistance and withstands the very corrosive conditions of the carbonization. In addition, the rotary tube 1 has a high resistance to a wide range of elements and compounds, in particular acids, especially sulfuric acid.

The rotary tube 1 makes it possible to carry out the sulfonation, carbonization and activation in a batch process in a single apparatus.

In the preferred working example shown in FIG. 1, the mixing elements 6 are installed or fastened and prepositioned on the inside 5 of the rotary tube body 2 by means of a binder. The mixing elements 6, the binder and the rotary tube body 2 are preferably firmly joined to one another by low-stress heat treatment and preferably subsequent heat treatment. Here, each mixing element 6 has been joined to the rotary tube body 2 in a separate step. This eliminates or minimizes stresses in the contact region between the individual mixing elements 6 and the rotary tube body 2. This leads to a very strong rotary tube 1 and prevents damage, in particular cracks, in the rotary tube 1. However, it is also possible in principle to fasten a group of, for example two, mixing elements 6 simultaneously to the inside 5 of the rotary tube body 2, preferably at positions which are very far apart.

In the preferred working example shown in FIG. 1, the mixing elements 6 are firmly and permanently, in particular adhesively, joined to the rotary tube body 2, preferably by melting. In the case of adhesive joins, the partners of the join are held together by atomic or molecular forces. This leads to a strong join between the mixing elements 6 and the rotary tube body 2.

The contact region between the rotary tube body 2 and the mixing elements 6 is preferably at least essentially free of residual stresses. This leads to increased stability of the mixing elements 6 and of the rotary tube body 2 and prevents damage, in particular cracks, in the quartz glass. The term "residual stresses" as used in the context of the present invention refers to mechanical stresses which prevail in a body on which no external forces act and which is in thermal equilibrium. This freedom from residual stresses has been achieved by not all mixing elements 6 having been simultaneously firmly joined to the inside 5 of the rotary tube body 2. This was carried out in at least two steps. Preference is given to each mixing element 6 being firmly joined separately to the inside 5.

Preference is in principle given to the mixing elements 6 being configured and/or arranged in such a way that the feed material 4 is moved or mixed at least essentially in the radial direction during operation of the rotary tube 1, in particular with no or only little transport of the feed material 4 in the axial direction taking place. The feed material 4 then does not collect at an end of the rotary tube 1 during the production process but instead remains distributed at least over a substantial part of the length of the rotary tube 1 and is mixed very well by means of the mixing elements 6 according to the invention during rotation of the rotary tube 1. The term "length" of the rotary tube 1 or of the rotary tube body 2 here refers to the dimension or extension of the rotary tube 1 or of the rotary tube body 2 in the axial direction.

In the preferred working example shown in FIG. 1, the rotary tube body 2 has a middle axial section 7 having a first internal cross section, two external axial sections 8 each having a second internal cross section and two transition sections 9 each having a third, tapering internal cross section. The middle axial section 7 can also be referred to as main reactor and the outer axial section 8 as stay tubes. The rotary tube 1 is preferably mounted so as to be rotatable at the outer axial sections 8. The mixing elements 6 are preferably arranged in the middle axial section 7.

In the preferred working example shown in FIG. 1, the middle axial section 7 and the two outer axial sections 8 are cylindrical, namely each configured as a straight hollow cylinder. The two transition sections 9 are cone-shaped or have the shape of a frustum of a cone.

The first internal cross section and/or the second internal cross section is/are preferably at least essentially uniform over the entire length thereof, preferably circular. The first internal cross section of the middle axial section 7 is preferably greater than the second internal cross section of the two outer axial sections 8. In the preferred working example shown in FIG. 1, the internal diameter of the middle axial section 7 is, in particular, greater than the internal diameter of the two outer axial sections 8. The middle axial section 7 is arranged here between the two transition sections 9 and the two outer axial sections 8. Furthermore, each transition section 9 is arranged between the middle axial section 7 and one of the two outer axial sections 8. The two transition sections 9 thus each form a connecting member between the middle axial section 7 and the outer axial sections 8. The conical or truncated conical shape of the transition sections 9 in this case tapers from an internal diameter corresponding to the internal diameter of the middle axial section 7 to an internal diameter corresponding to the internal diameter of the two outer axial sections 8.

As regards the production of the rotary tube 1, the middle axial section 7 is preferably firstly drawn from quartz glass. Subsequently or at the same time, the two outer axial sections 8 are drawn from quartz glass. The mixing elements 6 are then produced and subsequently, as described above, fastened thermally either individually or in groups to the inside 5 of the rotary tube body 2 by means of a binder and then subsequently heat treated individually or in groups. The outer axial sections 8 are subsequently adhesively bonded to the constricted end of the transition sections 9. Finally, the transition sections 9 are adhesively bonded at their unconstricted end to the middle axial section 7. Here too, subsequent fusion can be carried out.

The middle axial section 7 preferably has an internal diameter of from 200 mm to 1500 mm, more preferably from 220 mm to 1000 mm, even more preferably from 250 mm to 750 mm, particularly preferably from 260 mm to 500 mm, in particular at least essentially 300 mm.

The length of the middle axial section 7 is preferably from 30% to 1000%, more preferably from 60% to 500%, even more preferably from 100% to 300%, particularly preferably from 120% to 200%, in particular at least essentially 175%, of the size of the internal diameter of the middle axial section 7. In absolute terms, the length of the middle axial section 7 is preferably from 100 mm to 3000 mm, more preferably from 200 mm to 2000 mm, even more preferably from 300 mm to 1000 mm, particularly preferably from 400 mm to 700 mm, in particular at least essentially 520 mm.

The internal diameter of the two outer axial sections 8 is in each case preferably from 1% to 75%, more preferably from 5% to 60%, even more preferably from 10% to 40%, particularly preferably from 15% to 30%, in particular at least essentially 20%, of the size of the internal diameter of the middle axial section 7. In absolute terms, the internal diameter of the two outer axial sections 8 is in each case preferably from 10 mm to 200 mm, more preferably from 20 mm to 150 mm, even more preferably from 30 mm to 100 mm, particularly preferably from 40 mm to 80 mm, in particular at least essentially 65 mm.

Furthermore, the length of the two outer axial sections is in each case preferably from 10% to 200%, more preferably from 20% to 150%, even more preferably from 30% to 100%, particularly preferably from 40% to 75%, in particular at least essentially 50%, of the length of the middle axial section 7. In absolute terms, the length of the two outer axial sections 8 is in each case preferably from 50 mm to 1000 mm, more preferably from 100 mm to 750 mm, even more preferably from 150 mm to 500 mm, particularly preferably from 200 mm to 300 mm, in particular at least essentially 250 mm.

The length of the two transition sections 9 is in each case preferably from 1% to 100%, more preferably from 2% to 80%, even more preferably from 5% to 60%, particularly preferably from 10% to 40%, in particular at least essentially 20%, of the length of the middle axial section 7. In absolute terms, the length of the two transition sections 9 is preferably from 10 mm to 500 mm, more preferably from 25 mm to 400 mm, even more preferably from 50 mm to 300 mm, particularly preferably from 75 mm to 200 mm, in particular at least essentially 100 mm.

The length of the rotary tube 1 is preferably from 120% to 700%, more preferably from 150% to 500%, even more preferably from 175% to 400%, particularly preferably from 200% to 300%, in particular at least essentially 235%, of the length of the middle axial section 7. In absolute terms, the length of the rotary tube 1 is preferably from 200 mm to 6000 mm, more preferably from 500 mm to 4000 mm, even more preferably from 1000 mm to 2000 mm, in particular at least essentially 1220 mm.

It has in principle been found to be advantageous for the rotary tube 1 to have a backflow protection and/or overflow protection for solid and/or liquid materials present in the middle axial section 7, in particular for the sulfuric acid before and/or during sulfonation, on one or both of the outer axial sections 8. The backflow protection or overflow protection, in particular acid backflow protection, protects against backflow or overflow of the feed material 4, in particular the sulfuric acid before and/or during sulfonation, in one or both of the outer axial sections 8. The backflow protection or overflow protection also protects against overflow of the feed material 4 in one or both of the outer axial sections 8 during charging of the rotary tube 1.

The backflow protection or overflow protection is particularly important during the treatment with sulfuric acid, especially during sulfonation. The backflow protection prevents the sulfuric acid from flowing into one or both of the outer axial sections 8 during operation of the rotary tube 1, in particular during sulfonation. As a result of the backflow protection or overflow protection, the sulfuric acid ultimately remains in the middle axial section 7.

Different reaction conditions, in particular temperatures, prevail in the outer axial sections 8 than in the middle axial section 7. This is due, inter alia, to the outer axial sections 8 not being deliberately heated and quartz glass having a very low thermal conductivity (about 1.38 W/(m·K) at 20° C. Consequently, instead of sulfonation, the sulfuric acid would condense in the outer axial sections 8 and no longer be available for sulfonation.

In addition, the backflow protection or overflow protection prevents the feed material 4 from getting into the outer axial sections 8 and not being sufficiently mixed there. The backflow protection or overflow protection on the rotary tube 1 thus leads to a higher yield, to more complete reactions and to a more homogeneous sulfonation.

The backflow protection or overflow protection on the rotary tube 1 can, for example, be formed by the end 10 of one or both of the outer axial sections 8 adjacent to the respective transition section 9 projecting in the axial direction into the respective transition section 9. This is exaggerated in FIGS. 1 and 3 in the interests of clarity.

The distance by which the respective projecting end 10 of the outer axial sections 8 projects into the adjacent transition section 9 is preferably from 3% to 50%, more preferably from 5% to 30%, even more preferably from 10% to 20%, in particular essentially 15%, of the length of one of the two outer axial sections 8. In absolute terms, the distance by which the respective projecting end 10 of the outer axial sections 8 projects into the adjacent transition section 9 is preferably at least 2 mm, more preferably at least 5 mm, even more preferably at least 7 mm, in particular at least essentially 10 mm.

In the preferred embodiment shown in FIG. 1, the mixing elements 6 are plate-like, i.e. sheet-like and flat. An angled or creased form is in principle possible but complicated in the case of mixing elements 6 made of quartz glass which are to be fastened to the inside 5 of the rotary tube body 2 composed of quartz glass.

The mixing elements 6 preferably extend at least essentially in the axial direction, i.e. the largest dimension of the mixing elements 6 runs in the axial direction. In the preferred embodiment shown in FIG. 1, the mixing elements 6 extend axially parallel, i.e. parallel to the axis of rotation R of the rotary tube 1.

In the preferred embodiment shown in FIG. 1, all mixing elements 6 have the same length, the same width and the same thickness. Here, the term "width" of the mixing elements 6 refers to the dimension of the mixing elements 6 in the radial direction of the rotary tube body 2. The term "thickness" of the mixing elements 6 refers to the dimension of the mixing elements 6 in the circumferential direction of the rotary tube body 2. The same dimensioning of the mixing elements 6 ultimately means identity of the components, which leads to savings in the production of the mixing elements 6 and to simpler and cheaper installation of the mixing elements 6.

In the preferred embodiment shown in FIG. 1, the mixing elements 6 are in each case inclined by an angle of inclination α toward the inside 5 of the rotary tube body 2 at least essentially entirely in the direction of rotation D of the rotary tube 1. This is illustrated in FIG. 2 in which a section through the rotary tube 1 of FIG. 1 along the line II/II in FIG. 1 is shown schematically. The mixing elements 6 can, however, based on their length, also be inclined by the angle of inclination α toward the inside 5 of the rotary tube body 2 only in sections in the direction of rotation D of the rotary tube 1, i.e. the mixing elements 6 then no longer run axially parallel. The inclination of the mixing elements 6 leads to better mixing of the feed material 4.

In the preferred example shown in FIGS. 1 and 2, all mixing elements have the same angle of inclination α. This leads to uniform, simpler and cheaper installation of the mixing elements 6.

The mixing elements 6 preferably project in the radial direction into the rotary tube body 2 by not more than the magnitude of the radius of the rotary tube body 2. In other words, the width of the mixing elements 6 is not more than the radius of the rotary tube body 2 divided by the cosine of the angle of inclination α. The respective angle of inclination α of the mixing elements 6 is measured between the radius of the rotary tube body 2 extending from the contact region between the rotary tube body 2 and the respective mixing elements 6 and the plane running in the axial direction through the respective mixing element 6. In FIG. 2, the width of the mixing elements 6 is depicted in each case by means of a broken line.

The respective angle of inclination α of the mixing elements 6 is preferably from 1° to 60°, more preferably from 20° to 55°, even more preferably from 40° to 50°, in particular at least essentially 45°. The respective angle of inclination α of the mixing element is measured between the radius of the rotary tube body 2 extending from the contact region between the rotary tube body 2 and the respective mixing element 6 and the plane running in the axial direction through the respective mixing element 6. It has been found to be particularly advantageous for the respective angle of inclination α of the mixing elements 6 to be in the range from 35° to 55°, in particular at least essentially 45°, when the respective width of the mixing elements 6 is at least essentially 25% of the respective length of the mixing elements 6, in particular from 40 mm to 60 mm, preferably at least essentially 50 mm. In this arrangement or inclination of the mixing elements 6, very good mixing of the feed material 4 is obtained.

The length of the mixing elements 6 is preferably from 10% to 100%, more preferably from 20% to 75%, even more preferably from 30% to 50%, in particular at least essentially 40%, of the length of the middle axial section 7. In absolute terms, the length of the mixing elements 6 is preferably from 50 mm to 500 mm, more preferably from 100 mm to 300 mm, in particular essentially 200 mm.

The width of the mixing elements 6 is preferably from 5% to 50%, more preferably from 10% to 40%, even more preferably from 20% to 30%, in particular at least essentially 25%, of the length of the mixing elements 6. In absolute terms, the width of the mixing elements 6 is preferably from 10 mm to 100 mm, more preferably from 25 mm to 75 mm, in particular essentially 50 mm.

The thickness of the mixing elements 6 is preferably from 0.1% to 5%, more preferably from 0.5% to 3%, even more preferably from 1% to 2%, in particular at least essentially 1.5%, of the length of the mixing elements 6. In absolute terms, the thickness of the mixing elements 6 is preferably from 1 mm to 10 mm, more preferably from 2 mm to 5 mm, in particular essentially 3 mm.

In the preferred working example shown in FIG. 1, the mixing elements 6 have a length of 200 mm, a width of 50 mm and a thickness of 3 mm. At this dimensioning of the mixing elements 6, firstly very good mixing of the feed material 4 and secondly a contact area between the mixing elements 6 and the rotary tube body 2 which has been found to be advantageous in respect of the residual stresses brought about and the stability of the rotary tube 1 are obtained.

In the first preferred embodiment, a plurality of, preferably 10, mixing elements 6 are fastened or installed at a distance from one another in a first row in the circumferential direction in the middle axial section 7. In FIG. 1, the first row can be seen in the left-hand part of the middle axial section 7. The first row of mixing elements 6 forms a mixing section 3. The length of the first row corresponds to the length of the mixing elements 6 of the first row.

In addition, a plurality of, preferably 10, mixing elements 6 are fastened at a distance from one another in a second row in the circumferential direction in the middle axial section 7. In FIG. 1, the mixing elements 6 of the second row can be seen in the middle part of the middle axial section 7. The mixing elements 6 of the second row are offset in the axial direction, in particular overlapping, and/or offset in the circumferential direction relative to the mixing elements 6 of the first row. Thus, the mixing elements 6 of the second row are not fastened next to the mixing elements 6 of the first row in the axial direction. A mixing element 6 of the first row therefore alternates in the circumferential direction with a mixing element 6 of the second row in FIG. 2. In this arrangement of the mixing elements 6, very good mixing of the feed material 4 is obtained.

In the first preferred working example, a plurality of, preferably 10, mixing elements 6 are fastened at a distance from one another in a third row in the circumferential direction in the middle axial section 7. The mixing elements 6 of the third row are offset in the axial direction, in particular overlapping, and offset in the circumferential direction relative to the mixing elements 6 of the second row. Furthermore, the mixing elements 6 of the third row are here fastened at a distance from the mixing elements 6 of the first row in the axial direction. In the first preferred working example, a mixing element 6 of the first row runs along an axially parallel line in the axial direction relative to a mixing element 6 of the third row. The mixing elements 6 of the first and third rows are thus aligned in the axial direction. In FIG. 2, the mixing elements 6 of the third row are accordingly obscured by the mixing elements 6 of the first row since the mixing elements 6 of the third row are located behind the mixing elements 6 of the first row in FIG. 2. In this arrangement of the mixing elements 6, very good mixing of the feed material 4 is obtained.

The second and third rows also in each case form a mixing section 3. The mixing elements 6 of one or all rows are preferably at the same distance from one another in the circumferential direction.

Figure 3:
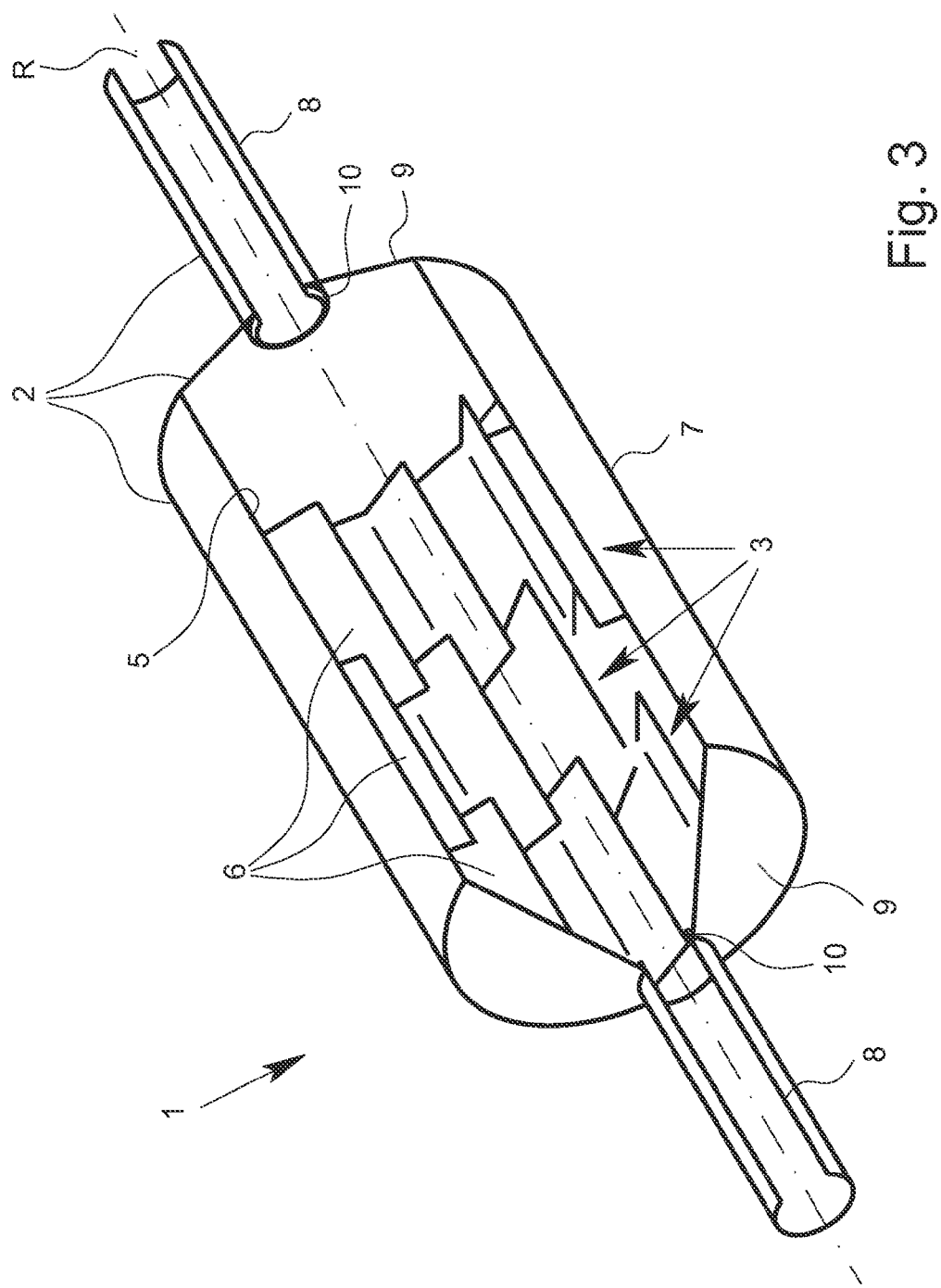

FIG. 3 schematically shows a perspective view of the first preferred embodiment of the rotary tube 1 according to the invention in FIG. 1, with part of the rotary tube 1 being cut out. FIG. 4 schematically shows a section through the rotary tube 1 of FIG. 1 along the line IV/IV in FIG. 2. FIG. 5 schematically shows a section through the rotary tube 1 of FIG. 1 along the line V/V in FIG. 2. These figures serve to more clearly show the preferred arrangement of the mixing elements 6 of the rotary tube 1 of FIG. 1.

Figure 6:
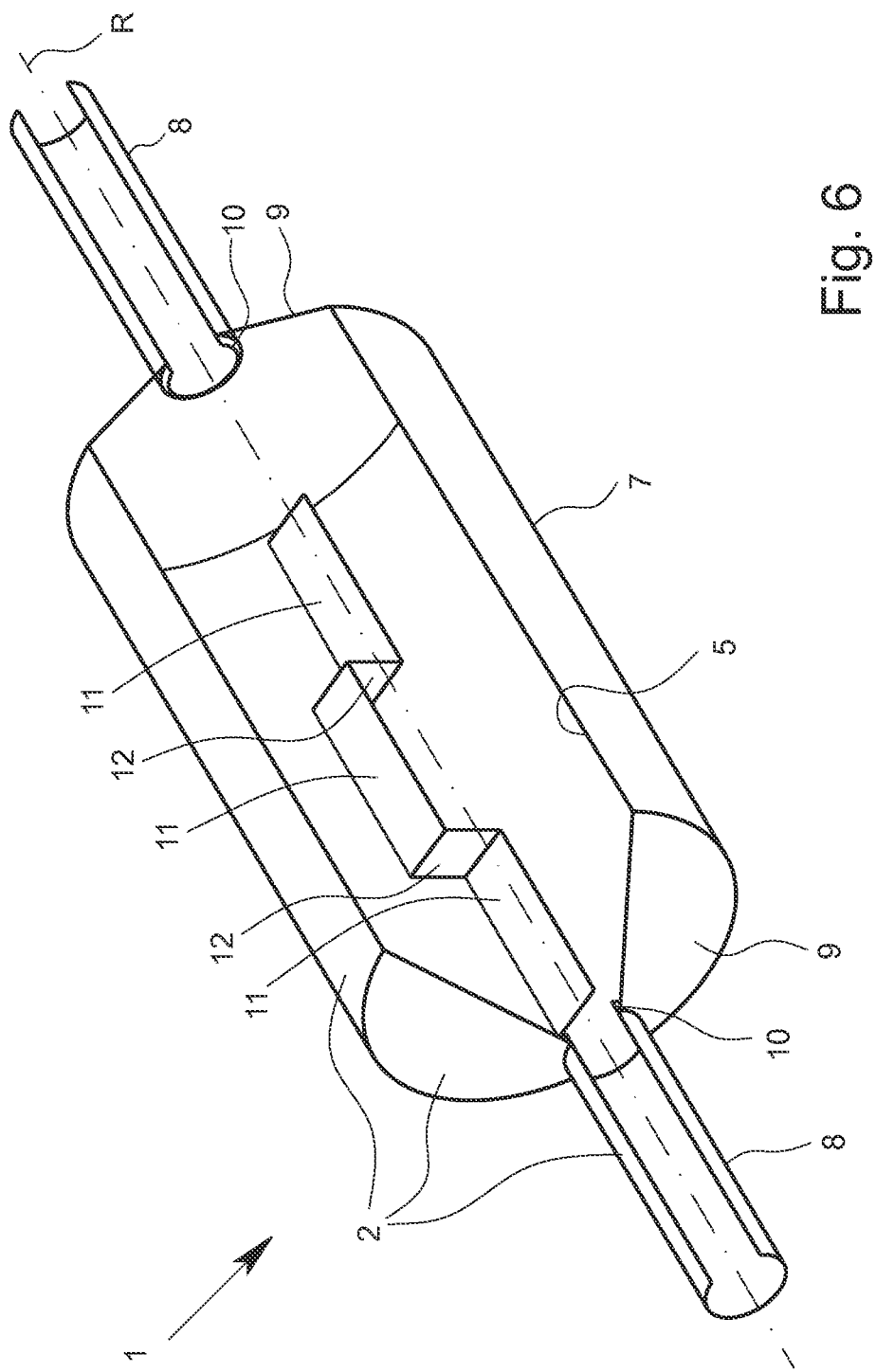

FIG. 6 schematically shows a perspective view of a second preferred embodiment of the rotary tube 1 according to the invention, with part of the rotary tube 1 being cut open. In the second preferred embodiment of the rotary tube 1 according to the invention, at least two, preferably three, rows, i.e. mixing sections 3, are formed by a preferably one-piece mixing element 6 fastened on the inside 5 of the rotary tube body 2. The mixing element 6 preferably has a plurality of, preferably three, mixing regions 11 running in the axial direction and a plurality of, preferably two, separator regions 12 running in the circumferential direction. The separator regions 12 prevent or minimize axial transport of the feed material 4. This embodiment makes it possible to realize a rotary tube 1 according to the invention simply and inexpensively. Furthermore, separator regions 12 which are separate from the mixing elements 6 or are joined thereto can be provided in the first preferred embodiment as per FIG. 1.

Apart from the rows or mixing sections 3 formed by the one mixing element 6, it is possible for further rows or mixing sections 3, e.g. having a plurality of mixing elements 6, to be provided, as described for the first preferred embodiment.

In the second preferred embodiment shown in FIG. 6, the mixing regions are inclined by an angle of inclination α toward the inside 5 of the rotary tube body 2 at least essentially in sections, preferably in their entirety, based on their length, in the direction of rotation D of the rotary tube 1. The respective angle of inclination α of the mixing regions 11 is preferably from 1° to 60°, more preferably from 20° to 55°, even more preferably from 40° to 50°, in particular at least essentially 45°. The inclination of the mixing regions 11 improves the mixing of the feed material 4.

The rotary tube body 2 and the mixing elements 6 preferably consist essentially of a quartz glass whose content of the materials indicated in table 1 does not exceed the maximum values indicated in this table.

TABLE 1

| Content of | is not more than | preferably not more than |
|---|---|---|
| Aluminum | 40 ppm | 20 ppm |
| Calcium | 3 ppm | 1.5 ppm |
| Chromium | 0.1 ppm | 0.05 ppm |
| Copper | 0.1 ppm | 0.05 ppm |
| Iron | 2 ppm | 1 ppm |
| Potassium | 3 ppm | 1.5 ppm |
| Lithium | 3 ppm | 1.5 ppm |
| Manganese | 0.2 ppm | 0.1 ppm |
| Sodium | 3 ppm | 1.5 ppm |
| Nickel | 0.04 ppm | 0.02 ppm |
| Titanium | 4 ppm | 2 ppm |
| Zirconium | 5.4 ppm | 2.7 ppm |
| OH | 90 ppm | 45 ppm |

The quartz glass of which the rotary tube body 2 and the mixing element 6 consists at least essentially of is preferably classified in the first hydrolysis class in accordance with DIN 12111 and/or the second acid class in accordance with DIN 12116 and/or the first alkali class in accordance with DIN 52322.

The quartz glass used preferably has an upper stress relief limit of at least 1100° C., more preferably at least 1200° C., in particular at least essentially 1204° C.

The quartz glass used preferably has a lower stress relief limit of at least 900° C., more preferably at least 1000° C., in particular at least essentially 1054° C.

The quartz glass used preferably allows a short-term use temperature of at least 1200° C., more preferably at least 1300° C. The quartz glass used preferably allows a long-term use temperature of at least 1000° C., more preferably at least 1100° C.

The rotary tube 1 of the invention can be further developed in such a way that the outer axial sections 8 each have an inlet and/or outlet opening for the introduction, discharge and passage of gases, in particular for the introduction of inert gases for the carbonization phase in the production of activated carbon and for the introduction of oxidizing gases for the activation phase in the production of activated carbon, and also for introducing and discharging the feed material 4. The outer axial sections 8 are ultimately hollow sections.

As described above, the rotary tube 1 according to the present invention is used in rotary tube furnaces for producing activated carbon. The present invention thus provides, according to a second aspect of the present invention, a rotary tube furnace for producing activated carbon by means of sulfonation, carbonization and activation in a batch process, which furnace has the above-described rotary tube 1 according to the present invention. The rotary tube furnace preferably has a heating device for direct and/or indirect heating of the rotary tube 1, in particular the middle axial section 7.

The present invention further provides, according to a third aspect of the invention, for the use of a rotary tube 1 as described above or a rotary tube furnace containing this rotary tube 1 for producing activated carbon by means of sulfonation, carbonization and activation in a batch process. The activated carbon is preferably produced on the basis of carbon-containing starting materials, in particular organic polymers, especially divinylbenzene-crosslinked polystyrenes, preferably in the form of small granules or spheres. The carbonization is preferably carried out at temperatures of from 100° C. to 750° C., more preferably from 150° C. to 650° C., in particular from 200° C. to 600° C., particularly preferably under an inert or at most slightly oxidizing atmosphere. Here, a step of precarbonization or preliminary low-temperature carbonization can precede the carbonization. The activation is preferably carried out at temperatures of from 700° C. to 1200° C., more preferably from 800° C. to 1100° C., particularly preferably from 850° C. to 1000° C. The activation is preferably carried out under controlled or selectively oxidizing conditions, in particular under an atmosphere which effects controlled oxidation.

The working examples shown in FIGS. 1 to 6 are only one, but preferred subset of the variants of a rotary tube 1 according to the invention.

Further embodiments, adaptations, variations, modifications, peculiarities and advantages of the present invention can readily be recognized and realized by a person skilled in the art on reading the description, without going outside the scope of the present invention.

The present invention is illustrated with the aid of the following working examples, which are not, however, intended to restrict the present invention in any way.

WORKING EXAMPLES

Example 1: Rotary Tube According to the Invention Composed of Quartz Glass with Mixing Sections and Backflow Protection at Both Ends (According to the Invention)

Activated carbon was produced as follows in a rotary tube furnace according to the invention composed of quartz glass with mixing sections and backflow protection at both ends as per FIGS. 1 to 5 and the above description of figures (dimensions of the rotary tube: internal diameter 800 mm, length 1500 mm, length of the mixing sections in each case 600 mm):

1000 kg of a conventional cation-exchange resin precursor of the gel type based on divinylbenzene-crosslinked polystyrene in spherical form having an average particle diameter of about 0.7 mm were introduced into said rotary tube and firstly dried at 100° C. for about one hour. 100 kg of concentrated sulfuric acid (oleum) were subsequently added under a nitrogen atmosphere and intensively mixed with the polymer spheres for the purpose of sulfonation and heated to temperatures of up to 300° C. Water vapor, sulfur dioxide and small amounts of sulfuric acid are firstly given off, and finally also hydrocarbons as a result of depolymerization and carbon dioxide. The sulfonation goes over directly into a carbonization under an inert gas atmosphere by means of heating to 800° C. Carbon dioxide, some carbon monoxide, hydrocarbons and sulfur dioxide are given off. The weight loss on a dry basis is about 45%. The carbonized material has an average particle diameter of about 0.6 mm at a BET surface area of about 250 $m^2/g$ as a result of loss of material and shrinkage. The carbonization operation takes a total of about four hours.

The total carbonized material (38.5 kg) was subsequently treated at 900° C. with a gaseous mixture of 75% of nitrogen and 25% of water vapor and cooled in the rotary tube after activation for two hours. After this activation, a spherical activated carbon which is completely free of iron and has a BET surface area of about 1475 $m^2/g$ and a compressive strength of 45 newton per sphere having a diameter of about 0.5 mm was obtained. The yield was, based on carbonized material, about 66%.

Example 2: Rotary Tube Composed of Quartz Glass without Mixing Sections and without Backflow Protection (Comparison)

Example 1 was repeated in a conventional rotary tube composed of quartz glass without mixing sections and without backflow protection but with the otherwise identical dimensions as in example 1. Due to the absence of backflow protection, some loss of sulfuric acid occurred during sulfonation, and part of this flowed back into the stay tubes of the rotary tube (as did parts of the polymer material to be sulfonated). The carbonization and activation times were increased in each case by about two hours compared to example 1 as a result of the poorer mixing. The yield after the activation was significantly lower than in example 1 (yield, based on carbonized material: about 48%). The BET surface area after activation was only about 1044 $m^2/g$ at a compressive strength of only 33 newton per sphere having a diameter of about 0.5 mm. A small part of the feed material was also entrained by the activating gas during activation as a result of the absence of backflow protection.

Example 3: Rotary Tube Composed of Quartz Glass without Mixing Sections and without Backflow Protection, but with Knob-Like Dents in the Rotary Tube Wall Projecting into the Interior of the Rotary Tube (Comparison)

Example 1 was repeated in a conventional rotary tube composed of quartz glass without mixing sections and without backflow protection, but with knob-like dents in the rotary tube wall projecting into the interior of the rotary tube and having the otherwise identical dimensions as in example 1. As a result of the absence of backflow protection, some loss of sulfuric acid occurred during the sulfonation, and part of this flowed back into the stay tubes of the rotary tube (as did parts of the polymer material to be sulfonated). The carbonization and activation times increased by about 1.5 hours or one hour, respectively, compared to example 1 as a result of poorer mixing, but was slightly improved compared to example 2 because of the knob-like dents projecting into the interior of the rotary tube. The yield after activation was significantly lower than in example 1 (yield, based on carbonized material: about 55%). The BET surface area after activation was only about 1205 m²/g at a compressive strength of only 38 newton per sphere having a diameter of about 0.5 mm. A small part of the feed material was also entrained by the activating gas during activation as a result of the absence of backflow protection.

The above examples impressively demonstrate the superiority of the rotary tube or rotary tube furnace of the invention. Efficient mixing and fluidization of the feed material is achieved, associated with shorter process times and improved products. Undesirable loss of containment of the sulfuric acid during sulfonation and also of the feed material is efficiently prevented as a result of the backflow protection. Furthermore, the rotary tube of the invention or the rotary tube furnace of the invention make it possible for the first time to carry out the total process in a rotary tube or rotary tube furnace composed of quartz glass.

LIST OF REFERENCE SYMBOLS

1 Rotary tube
2 Rotary tube body
3 Mixing section
4 Feed material
5 Inside of the rotary tube body
6 Mixing element
7 Middle axial section
8 Outer axial section
9 Transition section
10 Projecting end of the transition section
11 Mixing region
12 Separator region
D Direction of rotation
R Axis of rotation
α Angle of inclination

The invention claimed is:

1. A rotary tube for a rotary tube furnace, configured for producing activated carbon,
    the rotary tube comprising a rotary tube body and a plurality of mixing sections comprising a plurality of mixing elements for mixing a feed material, wherein the rotary tube body and the mixing elements consist at least essentially of a quartz glass (fused silica);
    wherein the mixing elements are fastened on an inside of the rotary tube body and are firmly joined to the inside, wherein the mixing elements are firmly and permanently joined to the rotary tube body and the mixing elements comprise a plate-like configuration;
    wherein the rotary tube body comprises a middle axial section comprising a first internal cross section, two outer axial sections each comprising a second internal cross section and two transition sections each comprising a tapering third internal cross section; and
    wherein the rotary tube comprises a backflow protection or an overflow protection for solid or liquid materials on one or both of the outer axial sections, wherein the backflow protection or overflow protection is configured in such a way that the end adjacent to the respective transition section of one or both of the outer axial sections projects in the axial direction into the respective transition section.

2. The rotary tube as claimed in claim 1,
    wherein the mixing element has been installed on or fastened to the inside of the rotary tube body by means of a binder.

3. The rotary tube as claimed in claim 1,
    wherein the mixing element and the rotary tube body have been joined to one another by low-stress heat treatment and subsequent heat treatment.

4. The rotary tube as claimed in claim 1,
    wherein the mixing element is arranged in the middle axial section.

5. The rotary tube as claimed in claim 1,
    wherein the middle axial section and the two outer axial sections are cylindrical, and
    wherein the two transition sections are conical.

6. The rotary tube as claimed in claim 1,
    wherein the first internal cross section of the middle axial section is greater than the second internal cross section of the two outer axial sections and
    wherein the middle axial section is arranged between the two transition sections and/or the two outer axial sections.

7. The rotary tube as claimed in claim 1,
    wherein each transition section is arranged between the middle axial section and one of the two outer axial sections.

8. The rotary tube as claimed in claim 1,
    wherein the backflow protection or the overflow protection is located in the transition from the transition section to the outer axial section.

9. The rotary tube as claimed in claim 1,
    wherein the backflow protection or the overflow protection is configured in such a way that it prevents backflow or overflow of feed material into one or both of the outer axial sections.

10. The rotary tube as claimed in claim 1,
    wherein the mixing elements extend at least essentially in axial direction.

11. The rotary tube as claimed in claim 1,
    wherein all mixing elements comprise essentially the same length or width or thickness, and
    wherein the mixing elements are each inclined by an angle of inclination α to the inside of the rotary tube body in the direction of rotation D of the rotary tube at least essentially in sections, based on their length,
    wherein the respective angle of inclination α of the mixing elements measured between the radius of the rotary tube body extending from the contact region between the rotary tube body and the respective mixing element and the plane running in the axial direction through the respective mixing element is in the range from 1 to 60°.

12. The rotary tube as claimed in claim 1,
    wherein the length of the mixing elements is from 10% to 100% of the length of the middle axial section.

13. The rotary tube as claimed in claim 1,
    wherein a plurality of mixing elements are fastened at a distance from one another in a first row in the circumferential direction in the middle axial section, and
    wherein a plurality of mixing elements are fastened at a distance from one another in a second row in the circumferential direction in the middle axial section.

14. The rotary tube as claimed in claim 13,
    wherein the mixing elements of the second row are overlapping in the axial direction and are offset in the circumferential direction relative to the mixing elements of the first row.

15. The rotary tube as claimed in claim 1,
    wherein the rotary tube body and the mixing element consist at least essentially of a quartz glass, and
    wherein the quartz glass comprises a content of aluminum of not more than 40 ppm.

16. The rotary tube as claimed in claim 1,
wherein the outer axial sections each comprise an inlet and outlet opening for the introduction, discharge and passage of gases and also for introducing and discharging a feed material.

17. A rotary tube furnace for producing activated carbon by means of sulfonation, carbonization and activation in a batch process,
wherein the rotary tube furnace comprises a rotary tube as claimed in claim 1.

18. The rotary tube furnace as claimed in claim 17,
wherein the rotary tube furnace comprises a heating device for direct or indirect heating of the rotary tube.

* * * * *